United States Patent
Cohen et al.

(10) Patent No.: US 9,411,718 B2
(45) Date of Patent: Aug. 9, 2016

(54) METHOD TO APPLY FINE GRAIN WEAR LEVELING AND GARBAGE COLLECTION

(71) Applicant: Seagate Technology LLC, Cupertino, CA (US)

(72) Inventors: Earl T. Cohen, Oakland, CA (US); Alex G. Tang, Cupertino, CA (US); Leonid Baryudin, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 217 days.

(21) Appl. No.: 13/743,858

(22) Filed: Jan. 17, 2013

(65) Prior Publication Data

US 2014/0181370 A1    Jun. 26, 2014

Related U.S. Application Data

(63) Continuation-in-part of application No. 13/724,905, filed on Dec. 21, 2012, now abandoned.

(51) Int. Cl.
*G06F 12/02* (2006.01)

(52) U.S. Cl.
CPC .... *G06F 12/0246* (2013.01); *G06F 2212/7204* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 7,934,052 B2 | 4/2011 | Prins et al. | 711/103 |
| 7,978,516 B2 | 7/2011 | Olbrich et al. | 365/185.11 |
| 8,122,193 B2 | 2/2012 | Song et al. | 711/117 |
| 8,423,722 B1* | 4/2013 | Deforest | G06F 3/0613 711/148 |
| 8,725,931 B1* | 5/2014 | Kang | 711/103 |
| 2007/0033324 A1* | 2/2007 | Sinclair | 711/103 |
| 2008/0091872 A1* | 4/2008 | Bennett et al. | 711/103 |
| 2012/0096217 A1* | 4/2012 | Son et al. | 711/103 |

* cited by examiner

*Primary Examiner* — Yaima Rigol
(74) *Attorney, Agent, or Firm* — Christopher P. Maiorana, PC

(57) ABSTRACT

An apparatus includes a non-volatile memory and a controller. The controller is coupled to the non-volatile memory and configured to (i) measure a rate of free space consumption in the non-volatile memory, (ii) measure a rate of free space production in the non-volatile memory, and (iii) adjust a rate of a recycling process in response to the measured rate of free space consumption and the measured rate of free space production.

20 Claims, 3 Drawing Sheets

METHOD TO APPLY FINE GRAIN WEAR LEVELING AND GARBAGE COLLECTION

This is a continuation-in-part of U.S. Ser. No. 13/724,905, filed Dec. 21, 2013, which is incorporated by reference.

FIELD OF THE INVENTION

The invention relates to memory systems generally and, more particularly, to a method and/or apparatus for applying fine grain wear leveling and garbage collection.

BACKGROUND OF THE INVENTION

In NAND flash based solid state drive (SSD) devices, the controller manages the process of garbage collection (GC) to consolidate free space. The controller also manages wear leveling (WL) to ensure program and erase (PE) cycles per flash block are all within a certain range. Garbage collection and wear leveling can be managed independently. Both GC and WL trigger reading of selected flash block(s) and rewriting (moving) user data that is still valid to another place. The process of moving user data that is still valid to another place is referred to herein as recycling. In other words, GC and WL are two different criteria of choosing a region (e.g., a block) that is to be recycled, and recycling comprises the rewriting of valid user data in the region to another place. Wear leveling typically has a coarse granularity such that one or more flash blocks are recycled for wear leveling at one time based on a trigger. Wear leveling is typically triggered according to the PE count of one or more blocks. When the wear leveling process occurs, the wear leveling process causes delays and introduces noticeable latencies to other activities. Because of the coarse granularity of the wear leveling and abrupt trigger, host activities can experience large fluctuations in latency.

It would be desirable to implement a method and/or apparatus for applying fine grain wear leveling and garbage collection.

SUMMARY OF THE INVENTION

The invention concerns an apparatus including a non-volatile memory and a controller. The controller is coupled to the non-volatile memory and configured to (i) measure a rate of free space consumption in the non-volatile memory, (ii) measure a rate of free space production in the non-volatile memory, and (iii) adjust a rate of a recycling process in response to the measured rate of free space consumption and the measured rate of free space production.

Embodiments of the invention include providing a method and/or apparatus for applying fine grain wear leveling and garbage collection that may (i) manage garbage collection and wear leveling at the same time, (ii) run garbage collection and wear leveling concurrently, (iii) provide an adaptive rate at which garbage collection and/or wear leveling are run, (iv) adapt the rate at which garbage collection and wear leveling are performed based on system state and/or host workload, (v) only do an amount of garbage collection and/or wear leveling that is necessary, (vi) perform wear leveling as a continuous process with a smooth rate of change, (vii) eliminate sudden performance degradation, (viii) improve host workload throughput, and/or (ix) be implemented in solid state drive (SSD) devices.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

Figure 1:
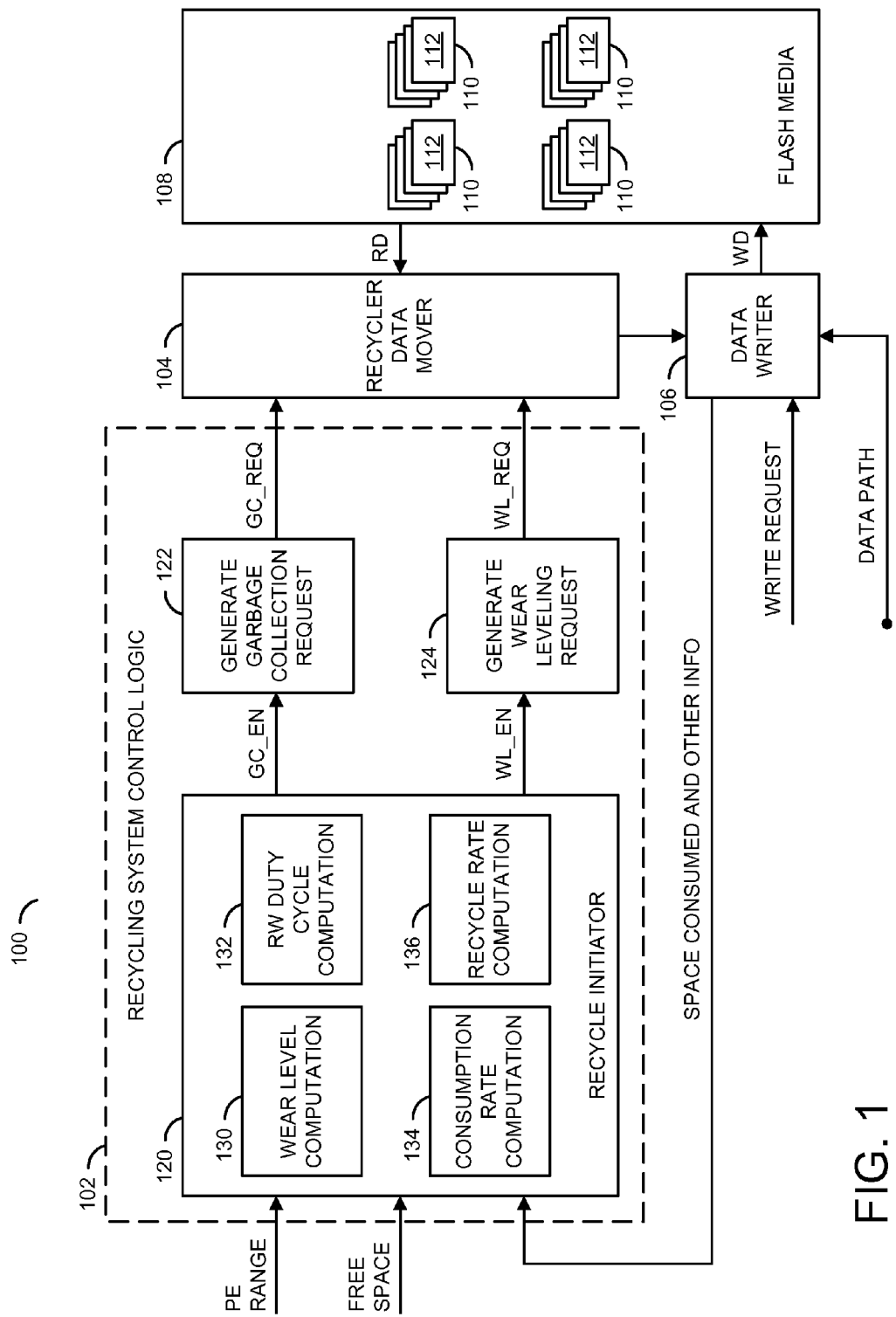
FIG. 1 is a diagram illustrating an embodiment of a system providing fine grain wear leveling and garbage collection in accordance with an embodiment of the invention.

Referring to FIG. 1, a diagram illustrating a system 100 implementing fine grain wear leveling (WL) and garbage collection (GC) in accordance with an embodiment of the invention is shown. The system 100 is generally configured to manage garbage collection and wear leveling at the same time. Embodiments of the system 100 run both garbage collection and wear leveling processes concurrently. The rate at which the system 100 runs the wear leveling (WL) and garbage collection (GC) processes is adaptive. In various embodiments, the rate at which the system 100 runs the wear leveling (WL) and garbage collection (GC) processes is based on the state of the system and/or host workload. The adaptive nature of the system 100 generally provides for doing only the amount of each of garbage collection and wear leveling that is necessary. By performing only the amount of each of garbage collection and wear leveling that is necessary, embodiments of the system 100 may provide an optimal host workload throughput and/or maintain even wear of the non-volatile memory without excessive overhead. Embodiments of the system 100 may perform garbage collection and/or wear leveling as a continuous process with a smooth rate of change. By performing garbage collection and/or wear leveling as a continuous process with a smooth rate of change, embodiments of the system 100 may eliminate the sudden performance degradation experienced with conventional garbage collection and/or wear leveling.

In some embodiments, the system 100 may comprise a block (or circuit) 102, a block (or circuit) 104, a block (or circuit) 106, and a block (or circuit) 108. The block 102 may implement a recycling system control logic. The block 104 may implement a recycler data mover. The block 106 may implement a data writer. The block 108 may be implemented as a non-volatile memory structure (e.g. Flash media, etc.). The blocks 102-108 may represent modules and/or blocks that may be implemented as hardware, software, a combination of hardware and software, or other implementations.

In various embodiments, the block 102 has a first input that receives a signal (e.g., PE_RANGE), a second input that receives a signal (e.g., FREE_SPACE), and a third input that receives a signal carrying information regarding space consumed and other information. According to various embodiments, PE_RANGE may comprise one or more of: maximum and minimum values of respective PE counts across all flash blocks enabled to contain user data; a difference between maximum and minimum values of respective PE counts across all flash blocks enabled to contain user data; and other representations of a range of PE counts across all flash blocks enabled to contain user data. In some embodiments, if PE_RANGE is less than a specified threshold, wear leveling is not enabled. In further embodiments, the specified threshold decreases as an average number of PE counts across all flash blocks enabled to contain user data increases.

According to various embodiments, FREE_SPACE may comprise one or more of: an amount of space that is available for host writes and/or recycling data writes to the non-volatile memory—so called "free blocks"; an amount of not used (free) space in the non-volatile memory across all flash blocks enabled to contain user data; a measure of the capacity of the non-volatile memory across all flash blocks enabled to contain user data; and a difference and/or ratio of any of the preceding. Free blocks do not contain any valid user data. The recycling process converts blocks which have some valid user data into free blocks, which contain none, thus making further write operation possible. The not used (free) space is only free in a sense that it does not contain any valid user data and therefore does not need to be moved elsewhere (recycled). However it will be possible to reclaim this free space only after valid data in the same flash blocks will be recycled. In other words, such free space could be considered as a potential but not actual space for write operations. In many embodiments, if FREE_SPACE is more than a specified threshold, garbage collection is not enabled. Naturally, it must be guaranteed that amount of space that is available for write operations is not zero, otherwise disabling GC will render write operations impossible and the storage device useless.

The block 102 may have a first output that presents a signal (e.g., GC_REQ) to a first input of the block 104 and a second output that presents a signal (e.g., WL_REQ) to a second input of the block 104. The block 104 has a third input that receives information (e.g., data to be relocated within the block 108) from the block 108 and a first output that presents information (e.g., data to be written to the block 108) to a first input of the block 106. The block 106 has a second input that receive a signal (e.g., WRITE REQUEST), a third input that is connected to a data path of the system 100, a first output that presents the signal carrying the information regarding space consumed to the block 102 and a second output that presents write data to the block 108. In some embodiments, the block 108 may comprise a number of flash devices 110. Each of the flash devices 110 may comprise a number of flash die 112.

The block 102 may comprise a block (or circuit) 120, a block (or circuit) 122, and a block (or circuit) 124. The block 120 may implement a recycle initiator. The block 122 may implement a garbage collection request generator. The block 124 may implement a wear leveling request generator. The block 120 may comprise a block (or circuit) 130, a block (or circuit) 132, a block (or circuit) 134, and a block (or circuit) 136. The block 130 may implement a wear level computation module. The block 132 may implement a recycle/wear level duty cycle compensation module. The block 134 may implement a consumption rate computation module. The block 136 may implement a recycle rate computation module. The block 120 is generally configured to control the blocks 122 and 124.

The recycling system 102 includes management of garbage collection and wear leveling. The recycling system 102 may implement a feedback system using system states, such as a number of the blocks which are available for writes (e.g., free blocks) and/or a measurement of free space, and real time measurements (e.g., of free space consumption and free space production) to determine a rate at which recycling needs to occur to maintain FREE_SPACE within a specified range while also performing wear leveling. The ratio of recycling work between garbage collection and wear leveling is generally determined at least in part by the program/erase (PE) range as compared to a target PE range associated with the device configuration and the life of the device at the point when the determination is made.

In various embodiments, the recycling system 102 measures the rate of free space consumption. The free space consumption rate accounts for both host writes and write amplification factors including recycling. The free space consumption rate may be measured directly by, for example, accounting for all the space being written to flash media. Alternatively, the free space consumption rate may be calculated from the measured amount of host writes and an indirectly calculated write amplification factor based on used space tracking statistics. In various embodiments, the recycling system 102 measures the rate of free space production. The free space production rate can be determined by the rate at which flash pages or blocks complete recycling and become available for re-use. The free space production generally comes from a combination of garbage collection and wear leveling. In various embodiments, the recycling system 102 is configured to balance the free space consumption and free space production by making the entire recycling process run faster or slower. In turn, varying the speed of the recycling process may also make the host throughput go up or down.

In some embodiments, the recycling system 102 picks one or more flash blocks for the purpose of garbage collection (GC) and picks one or more flash blocks for the purpose of wear leveling (WL). When the recycling system is active, the recycling system duty cycles between the blocks selected for garbage collection and the blocks selected for wear leveling to produce free space. The switch between GC and WL can happen at a fine grain boundary such as a flash page thus reducing delays and latencies which are intrinsic for conventional methods. The fine-grained switching between GC and WL enables GC and WL to be performed substantially at the same time (concurrently). By switching between (e.g., by interleaving) GC and WL at a fine grain boundary, free space can be produced at a relatively steady rate despite differences in the amount of space being returned from the portions of memory (e.g., pages, blocks, etc.) selected for garbage collection and the portions of memory (e.g., pages, blocks, etc.) selected for wear leveling.

In some embodiments, the recycling ratio between wear leveling and garbage collection blocks may be determined according to the following Equation 1:

$$Rw=\text{WEAR\_RATE}/\text{SPACE\_RATE}, \qquad \text{EQ.1}$$

where WEAR_RATE is the rate of recycling for WL purposes, and SPACE_RATE is the rate of recycling for GC purposes. The rate can be measured in various units, according to embodiment, such as in pages, in blocks, or in MBps. In a steady state system, the ratio Rw is kept substantially constant so a constant level of wear leveling is maintained, and actual current value of Rw is determined according to various factors such as PE_RANGE, FREE_SPACE, and host write rates. In some embodiments, if wear leveling falls behind or if wear leveling gets ahead, then the ratio Rw is changed in a smooth, fashion to allow the wear leveling to catch up or to slow down the wear leveling. In further embodiments, the ratio Rw is changed in a non-linear fashion such that as PE_RANGE gets further away from a specified target range, non-linearly increasing (such as faster than linear) emphasis is put on wear leveling, and when PE_RANGE is within the specified target range, non-linearly decreasing (such as faster than linear) emphasis is put on wear leveling.

According to various embodiments, fine-grained interleaving of recycling for wear leveling and recycling for garbage collection comprises one or more of: selectively switching between recycling for wear leveling and recycling for garbage collection on a fixed time interval (e.g., once per millisecond) where the selective switching is according to Rw; repeatedly performing a process of recycling for wear leveling for a first duration and recycling for garbage collection for a second duration, where the first duration and the second duration are determined, in one example, according to Rw; repeatedly recycling a first amount of data for wear leveling and recycling a second amount of data for garbage collection, where the first amount and the second amount are determined, for example, according to Rw; any other technique for alternating between recycling for wear leveling and recycling for garbage collection according to Rw; any of the foregoing including dynamically updating Rw; and any combination of the foregoing.

Recycling activity is proportional to the rate of free space consumption, which is directly related to the host write throughput. The system 100 generally measures the free space consumption rate at a predetermined sampling rate and adjusts the recycling activity accordingly. The sampling rate is chosen to allow sufficient granularity so the recycling process can adapt to the host workload smoothly. The rate of free space consumption by host writes is kept comparable to the rate of free space production by recycling so that free space remains roughly constant. An amount of hysteresis in the free space (e.g., by keeping a number of free blocks within determined bounds) enables a tolerance level in the relative rates of free space consumption vs. free space production. For example, free space consumption may be enabled to be faster than free space production if there are sufficient free blocks. However, when the number of free blocks drops below a threshold number of free blocks, free space consumption may be slowed relative to free space production.

Since the types of recycling activity comprise both recycling for garbage collection and recycling for wear leveling, an amount of free space production obtained by recycling varies according to the type of recycling being performed. When solely recycling for wear leveling, resulting in little free space production, free space consumption (e.g., host writes) may be unnecessarily throttled. By operating recycling for wear leveling and recycling for garbage collection concurrently (e.g., substantially at a same time, such as by fine-grained interleaving of the two types of recycling), the rate of free space production by recycling is kept from changing abruptly while still providing the necessary rates of both types of recycling. In turn, keeping the rate of free space production from changing abruptly, keeps the rate of free space consumption (e.g., host writes) from having to change abruptly.

An SSD is generally formatted to have a specified minimum over-provisioning (OP), such as but not limited to 0%, 7%, or 28%. According to various embodiments and/or usage scenarios, the effective over-provisioning (EOP) may be less than the OP due to part of the SSD being used for system purposes. Yet in other embodiments and/or usage scenarios, EOP may be more than the OP and/or may vary over time due to one or more of: not all of the SSD being in use; at least some portions of the SSD having been trimmed; the SSD being able to reduce an amount of host data written to the non-volatile memory such as by compression and/or de-duplication; and any combination of the foregoing.

Recycling returns an amount of free space according to used space in the region (e.g., block) being recycled. Effective over-provisioning (EOP), as used herein, is defined as 1 less than the ratio of total capacity to used space. EOP may be expressed using the following Equation 2:

$$\text{EQ.2}$$

The above formula can be applied to the entire drive as well as to any part of the drive, including a single block. Because free space is equal to capacity minus used space, EOP may also be defined according to free space. In some embodiments, such as when random writes from the host predominate, EOP of individual blocks or SSD regions is adjusted according to an exponential decay curve because the emptiest blocks and/or regions of the SSD are more empty than average. For example, in some embodiments, EOP of the emptiest block and/or region (which is in fact the best candidate for GC) is defined according to OP as a solution to the following Equation 3:

$$e^{\wedge}(-EOP)=1-EOP*(1-OP). \quad \text{EQ.3}$$

When a given region (e.g., a block) of the SSD is recycled, the amount of space returned is based upon the used space in the region (or equivalently the free space in the region) because used space (valid user data) will be rewritten to another place and therefore not freed. Generally, regions being recycled for wear leveling return less space than regions being recycled for garbage collection. Embodiments of the system 102 are enabled to determine an estimate of EOP of a block and/or an estimate of free space returned from recycling for wear leveling and/or an estimate of free space returned from recycling for garbage collection, and to use these estimates to adjust the overall rate of recycling, and/or Rw (the ratio of recycling for wear leveling vs. recycling for garbage collection). In turn, the overall rate of recycling is used to adjust an allowed rate of host writes so that the system maintains a steady state amount of FREE_SPACE and/or of wear.

In some embodiments, a rate of recycling varies with an amount of free space and/or with EOP of the drive. For example, when there is more than a specified amount of free space, recycling may be disabled. When the EOP of the emptiest block is approximately 50%, the ratio of recycling writes to host writes is approximately 1-to-1. As EOP increases, the rate of recycling decreases, and as EOP decreases, the rate of recycling increases. In further embodiments, the rate of decrease and/or increase in recycling is non-linear with EOP, such as by being faster-than-linear.

Figure 2:
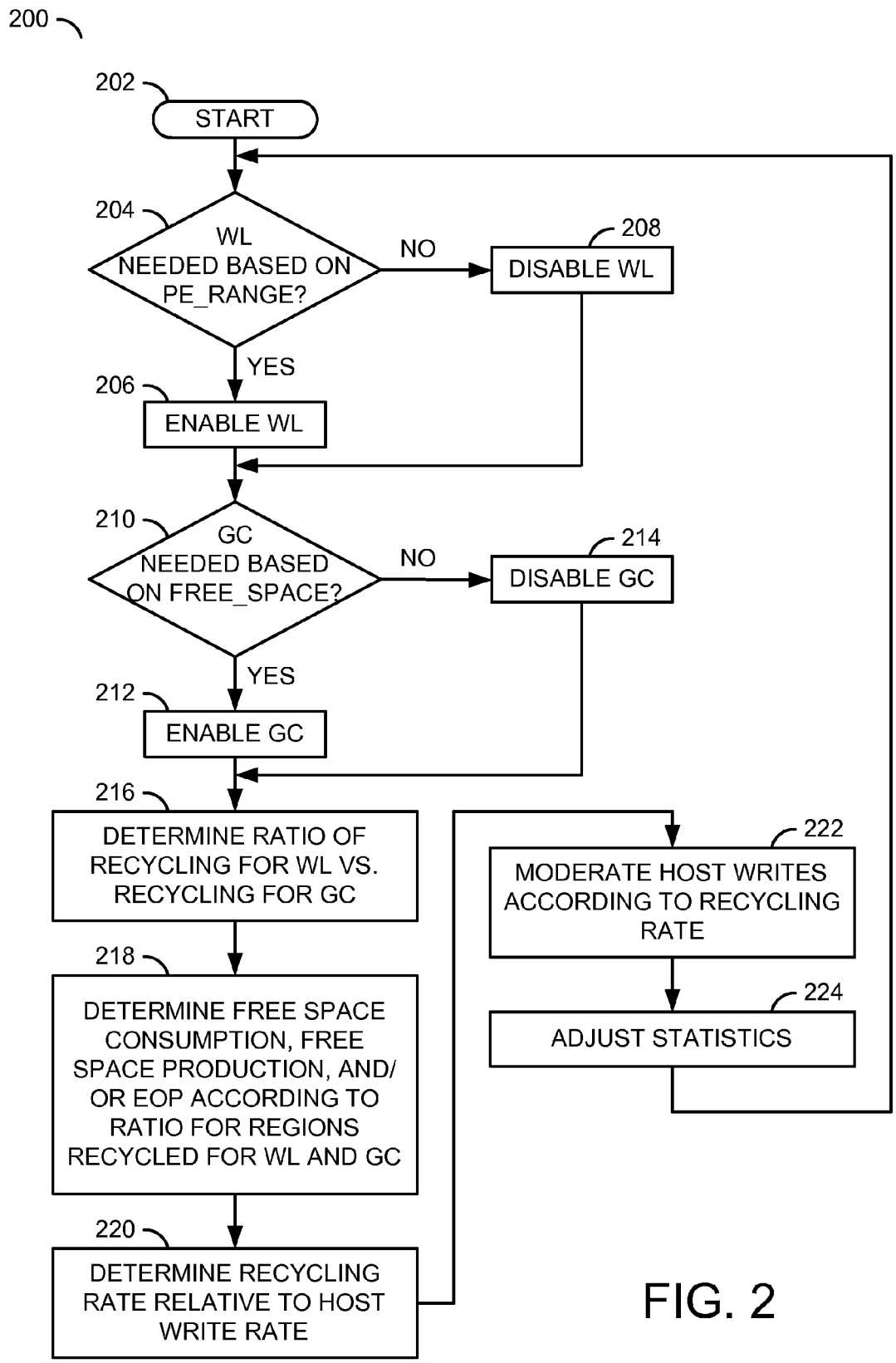
FIG. 2 is a flow diagram illustrating a process of fine grain wear leveling and garbage collection in accordance with an embodiment of the invention.

Referring to FIG. 2, a flow diagram is shown illustrating a recycling process 200 in accordance with an embodiment of the invention. The process (or method) 200 may comprise a step (or state) 202, a step (or state) 204, a step (or state) 206, a step (or state) 208, a step (or state) 210, a step (or state) 212, a step (or state) 214, a step (or state) 216, a step (or state) 218, a step (or state) 220, a step (or state) 222 and a step (or state) 224. The process 200 may begin in the state 202 and move to the state 204 upon a recycle request from either GC or WL or both. In the state 204, the process 200 determines whether wear leveling is needed based upon PE_RANGE. In some embodiments, the program and erase (PE) range PE_RANGE is compared to a target PE range associated with the non-volatile memory. If the answer is yes (WL is needed), the process 200 moves to the state 206 and enables WL. Otherwise the process 200 moves to the state 20S and disables WL. The process 200 then moves to the state 210.

In the state 210, the process 200 determines whether GC is needed based upon FREE_SPACE. If the answer is yes (GC is needed), the process 200 moves to the state 212 and enables GC. Otherwise the process 200 goes to the state 214 and disables GC. The process 200 then moves to the state 216. In the state 216, the process 200 determines a ratio of recycling for WL vs. recycling for GC. The process 200 then moves to the state 218 where the process 200 determines free space consumption, free space production, and/or EOP according to the ratio for regions recycled for WL and GC (e.g., the ratio Rw). The process 200 then moves to the state 220. In the state 220, the process 200 determines a recycling rate relative to a host write rate and moves to the state 222. In the state 222, the process 200 moderates host writes according to the recycling rate and moves to the state 224. In the state 224, the process 200 adjusts statistics and returns to the state 204.

Figure 3:
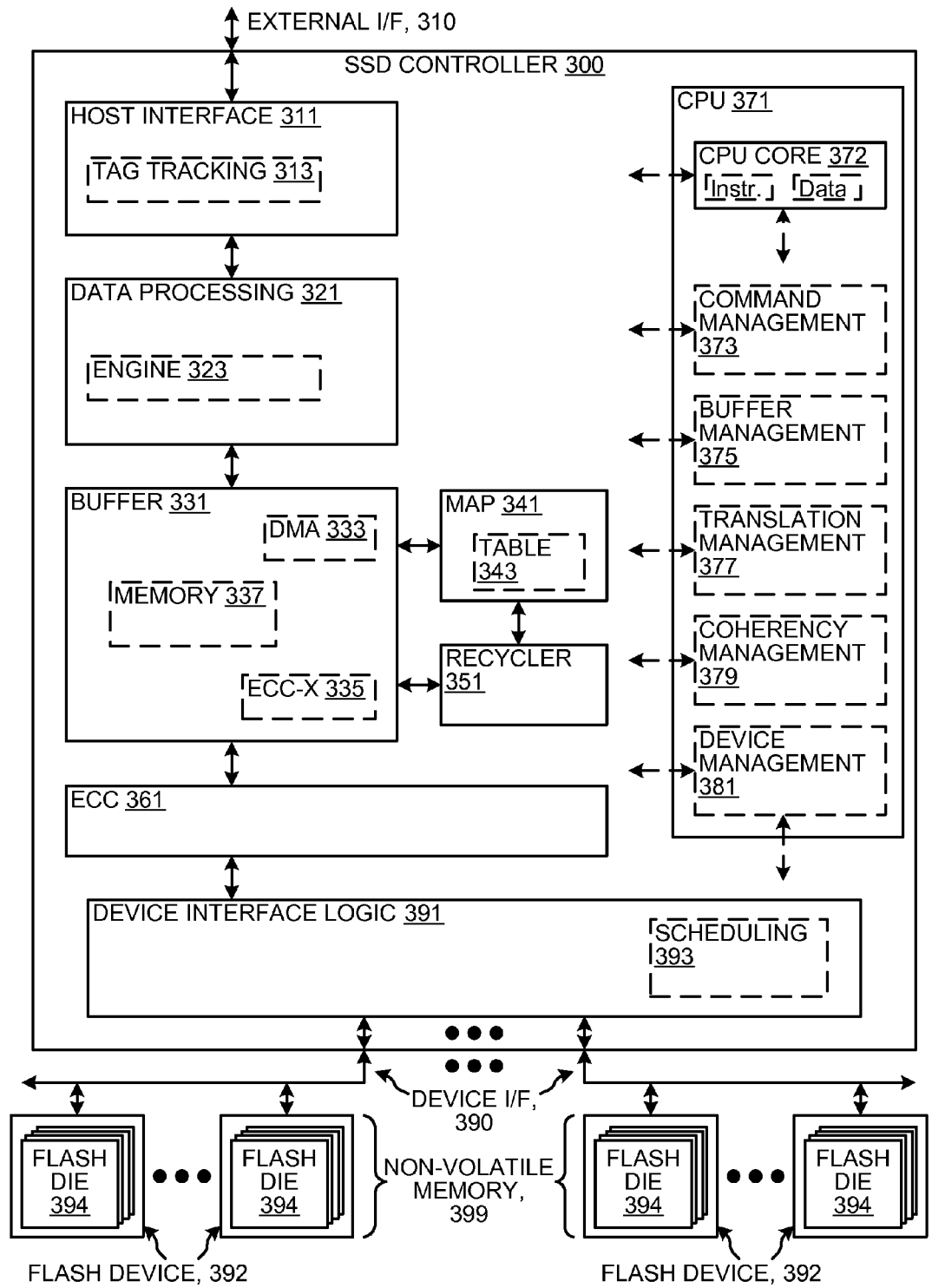
FIG. 3 is a diagram illustrating an embodiment of a Solid-State Disk (SSD) including an SSD controller implementing fine grain wear leveling and garbage collection in accordance with embodiments of the invention.

Referring to FIG. 3, a diagram is shown illustrating a solid-state disk (SSD) including an SSD controller 300 in which fine grain wear leveling and garbage collection techniques in accordance with an embodiment of the invention may be implemented to migrate data in non-volatile (e.g., Flash) memory before an error rate becomes too high to correct. The SSD controller 300 may be coupled via one or more external interfaces 310 to a host (not shown). According to various embodiments, external interfaces 310 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, the SSD controller 300 includes a SATA interface and a PCIe interface.

The SSD controller 300 is further coupled via one or more device interfaces 390 to non-volatile memory 399 including one or more storage devices, such as flash devices 392. According to various embodiments, device interfaces 390 are one or more of: an asynchronous interface; a synchronous interface; a DDR synchronous interface; an ONFI compatible interface, such as an ONFI 2.2 compatible interface; a Toggle-mode compatible flash interface; a non-standard version of any of the preceding interfaces; a custom interface; or any other type of interface used to connect to storage devices.

The Flash devices 392 have, in some embodiments, one or more individual flash die 394. According to a type of a particular one of the flash devices 392, a plurality of flash die 394 in the particular flash device 392 are optionally and/or selectively accessible in parallel. The Flash devices 392 are generally representative of one type of storage device enabled to communicatively couple to SSD controller 300. However, in various embodiments, any type of storage device is usable, such as an SLC (single level cell) NAND flash memory, MLC (multi-level cell) NAND flash memory, TLC (triple level cell) NAND flash memory, NOR flash memory, read-only memory (ROM), static random access memory (SRAM), dynamic random access memory (DRAM), magneto-resistive random-access memory (MRAM), ferromagnetic memory (e.g., FeRAM, F-RAM FRAM, etc.), phase-change memory (e.g., PRAM, PCRAM, etc.), racetrack memory (or domain-wall memory (DWM)), or any other type of memory device or storage medium.

According to various embodiments, the device interfaces 390 are organized as: one or more busses with one or more flash devices 392 per bus; one or more groups of busses with one or more flash devices 392 per bus, where busses in a group are generally accessed in parallel; or any other organization of flash devices 392 coupled to device interfaces 390.

The SSD controller 300 may have one or more modules, such as a host interface module 311, a data processing module 321, a buffer 331, a map 341, a recycler 351, an error-correcting code (ECC) module 361, a central processing unit (CPU) 371, and device interface logic 391. The specific modules and interconnections illustrated in FIG. 3 are merely representative of one embodiment, and many arrangements and interconnections of some or all of the modules, as well as additional modules not illustrated, may be implemented to meet the design criteria of a particular implementation. In a first example, in some embodiments, there are two or more host interfaces 311 to provide dual-porting. In a second example, in some embodiments, the data processing module 321 and/or the ECC module 361 are combined with the buffer 331. In a third example, in some embodiments, the host interfaces 311 are directly coupled to the buffer 331, and the data processing module 321 optionally and/or selectively operates on data stored in the buffer 331. In a fourth example, in some embodiments, the device interface logic 391 is directly coupled to the buffer 331, and the ECC module 361 optionally and/or selectively operates on data stored in the buffer 331.

The host interface 311 sends and receives commands and/or data via the external interface 310, and, in some embodiments, tracks progress of individual commands via the tag tracking module 313. For example, the commands include a read command specifying an address (such as an LBA) and an amount of data (such as a number of LBA quanta, e.g. sectors) to read; in response the SSD provides read status and/or read data. For another example, the commands include a write command specifying an address (such as an LBA) and an amount of data (such as a number of LBA quanta, e.g. sectors) to write; in response the SSD provides write status and/or requests write data and optionally subsequently provides write status. In some embodiments, the host interface 311 is compatible with a SATA protocol and, using NCQ commands, is enabled to have up to 32 pending commands, each with a unique tag represented as a number from 0 to 31. In some embodiments, the tag tracking module 313 is enabled to associate an external tag for a command received via the external interface 310 with an internal tag used to track the command during processing by SSD controller 300.

According to various embodiments, one or more of: data processing module 321 optionally and/or selectively processes some or all data sent between the buffer 331 and the external interfaces 310; and data processing module 321 optionally and/or selectively processes data stored in the buffer 331. In some embodiments, the data processing module 321 uses one or more engines 323 to perform one or more of: encrypting; decrypting; compressing; decompressing; formatting; reformatting; transcoding; and any other data processing and/or manipulation task.

The buffer 331 stores data sent to/from the external interfaces 310 from/to the device interfaces 390. In some embodiments, the buffer 331 additionally stores system data, such as some or all map tables, used by the SSD controller 300 to manage the flash devices 392. In various embodiments, the buffer 331 has one or more of: a memory 337 used for temporary storage of data; a direct memory access (DMA) modules 333 used to control movement of data to and/or from the buffer 331; an ECC-X module 335 used to provide a higher-level error correction function; and other data movement and/or manipulation functions. An example of a higher-level error correction function is a RAID-like capability, where redundancy is at a flash device (e.g. multiple ones of the flash devices 392) level and/or a flash die (e.g. flash die 394) level instead of at a disk level.

According to various embodiments, one or more of: the ECC module 361 optionally and/or selectively processes some or all data sent between the buffer 331 and the device interfaces 390; and the ECC module 361 optionally and/or selectively processes data stored in the buffer 331. In some embodiments, the ECC module 361 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding.

The device interface logic 391 controls the flash devices 392 via the device interfaces 390. The device interface logic

391 is enabled to send data to/from the flash devices 392 according to a protocol of the flash devices 392. The device interface logic 391 includes a scheduling module 393 to selectively sequence control of the flash devices 392 via the device interfaces 390. For example, in some embodiments, the scheduling module 393 is enabled to queue operations to the flash devices 392, and to selectively send the operations to individual ones of the flash devices 392 (or the flash die 394) as individual flash devices 392 (or flash die 394) are available.

The map 341 converts between data addressing used on the external interfaces 310 and data addressing used on the device interfaces 390, using table 343 to map external data addresses to locations in the non-volatile memory 399. For example, in some embodiments, the map 341 converts logical block addresses (LBAs) used on the external interfaces 310 to block and/or page addresses targeting one or more flash die 394, via mapping provided by table 343. In some embodiments, a granularity of map 341 is fixed, such as mapping first fixed-sized logical blocks used on the external interfaces 310 to second fixed-sized blocks used on the device interfaces 390. In other embodiments, a granularity of map 341 is variable and not all blocks used on either the external interfaces 310 or the device interfaces 390 are necessarily a same size.

In some embodiments, table 343 associates logical page addresses with a respective map entry, where the logical page addresses are a portion of and/or are derived from the LBA, and the map entry identifies a portion of the non-volatile memory. For example, in some embodiments, the logical page address is a higher-order portion of the LBA, and a lower-order portion of the LBA is an offset within a logical page specified by the logical page address.

In some embodiments, the map entry identifies the portion of the non-volatile memory as a base address, such as a read unit address, and a length, such as a number of read units. In some embodiments, the read units are sequential in locations in an address space of the non-volatile memory. In further embodiments, the read units are striped across a plurality of flash die (such as flash die 394) and/or flash devices (such as flash devices 392).

In some embodiments, map 341 uses table 343 to perform and/or to look up translations between addresses used on the external interfaces 310 and data addressing used on the device interfaces 390. According to various embodiments, table 343 is one or more of: a one-level map; a two-level map; a multi-level map; a map cache; a compressed map; any type of mapping from one address space to another; and any combination of the foregoing. According to various embodiments, table 343 includes one or more of: static random access memory (SRAM); dynamic random access memory (DRAM); non-volatile memory (such as flash memory); cache memory; on-chip memory; off-chip memory; and any combination of the foregoing.

In some embodiments, the recycler module 351 performs garbage collection. For example, in some embodiments, flash devices 392 contain blocks that must be erased before the blocks are re-writeable. The recycler module 351 is enabled to determine which portions of the flash devices 392 are actively in use, such as by scanning a map maintained by map 341, and to make unused portions of flash devices 392 available for writing by erasing them. In further embodiments, the recycler module 351 is enabled to move data stored within the flash devices 392 to make larger contiguous portions of the flash devices 392 available for writing.

The CPU 371 controls various portions of SSD controller 300. The CPU 371 includes a CPU core 372. The CPU core 372 is, according to various embodiments, one or more single-core or multi-core processors. The individual processor cores in the CPU core 372 are, in some embodiments, multi-threaded. The CPU core 372 includes instruction and/or data caches and/or memories. For example, the instruction memory contains instructions to enable the CPU core 372 to execute software (sometimes called firmware) to control the SSD controller 300. In some embodiments, some or all of the firmware executed by the CPU core 372 is stored on the flash devices 392.

In various embodiments, the CPU 371 further includes: a command management module 373 to track and control commands received via the external interfaces 310 while the commands are in progress; a buffer management module 375 to control allocation and use of the buffer 331; a translation management module 377 to control the map 341; a coherency management module 379 to control consistency of data addressing and to avoid conflicts such as between external data accesses and recycle data accesses; a device management module 381 to control device interface logic 391; and optionally other management units. In one example, the device management module 381 may be configured to implement a fine grain wear leveling and garbage collection process in accordance with embodiments of the invention. None, any, or all of the management functions performed by the CPU 371 are, according to various embodiments, controlled and/or managed by hardware, by firmware, by software (such as software executing on the CPU core 372 or on a host connected via the external interfaces 310), or any combination thereof. The device management module 381 may be implemented as part of the CPU 371, or could be implemented in hardware, or could be implemented by a combination of firmware running on the CPU 371 and hardware.

In some embodiments, the CPU 371 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to the SSD controller 300 and is compatible with operation with various computing hosts, such as via adaptation of the host interface 311 and/or the external interface 310. The various computing hosts include one or any combination of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game.

In various embodiments, all or any portion of an SSD controller 300 (or a computing-host flash memory controller) are implemented on a single integrated circuit (IC), a single die of a multi-die IC, a plurality of dice of a multi-die IC, or a plurality of ICs. For example, the buffer 331 is implemented on a same die as other elements of the SSD controller 300. For another example, the buffer 331 is implemented on a different die than other elements of SSD controller 300.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions represented by the diagrams of FIGS. 1-3 may, in some embodiments, be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

Embodiments of the invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

Embodiments of the invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to process a plurality of read/write operations to/from a memory; and
   a controller coupled to the interface and configured to measure a rate of free space consumption in the memory, measure a rate of free space production in the memory, and adjust a rate of a recycling process in response to the measured rate of free space consumption and the measured rate of free space production, wherein the controller is configured to generate garbage collection requests selecting portions of the memory for garbage collection, generate wear leveling requests selecting portions of the memory for wear leveling, perform recycling operations for garbage collection and recycling operations for wear leveling concurrently by interleaving the recycling operations being performed in response to the garbage collection requests and the recycling operations being performed in response to the wear leveling requests at page level fine grain boundaries, and control a ratio of activity between the recycling operations for garbage collection and the recycling operations for wear leveling.

2. The apparatus according to claim 1, wherein the rates of free space consumption and free space production are measured in real time.

3. The apparatus according to claim 1, wherein the rate of free space production takes into account both free space returned via recycling for garbage collection and free space returned via recycling for wear leveling.

4. The apparatus according to claim 3, wherein the controller is further configured to provide a steady rate of free space production despite differences in a rate of space being returned from the portion of the memory selected for garbage collection and a rate of space being returned from the portion of the memory selected for wear leveling.

5. The apparatus according to claim 3, wherein the controller is further configured to determine the ratio of activity between the recycling for garbage collection and the recycling for wear leveling based upon a program and erase (PE) range.

6. The apparatus according to claim 5, wherein the controller compares the program and erase (PE) range to a predefined target PE range associated with the memory.

7. The apparatus according to claim 6, wherein the predefined target PE range associated with the memory is based upon a configuration and life expectancy of the memory.

8. The apparatus according to claim 1, wherein the rate of free space consumption is determined according to one or more of directly measuring the rate of free space consumption by accounting for space being written in the memory, calculating the rate of free space consumption from a measured amount of host writes, and indirectly calculating write amplification based on used space tracking statistics.

9. The apparatus according to claim 1, wherein the controller is further configured to balance free space consumption and free space production by speeding up or slowing down one or both of the recycling of the portion of the memory selected for garbage collection and the recycling of the portion of the memory selected for wear leveling.

10. The apparatus according to claim 1, wherein the interface and the controller are part of a solid state drive (SSD) controller.

11. A method of fine grain wear leveling and garbage collection comprising the steps of:
measuring a rate of free space consumption in a memory;
measuring a rate of free space production in the memory; and
adjusting a rate of a recycling process in response to the measured rate of free space consumption and the measured rate of free space production, wherein the recycling process comprises generating garbage collection requests selecting portions of the memory for garbage collection, generating wear leveling requests selecting portions of the memory for wear leveling, performing recycling operations for garbage collection and recycling operations for wear leveling concurrently by interleaving the recycling operations being performed in response to the garbage collection requests and the recycling operations being performed in response to the wear leveling requests at page level fine grain boundaries, and controlling a ratio of activity between the recycling operations for garbage collection and the recycling operations for wear leveling.

12. The method according to claim 11, wherein:
the rate of free space consumption takes into account host writes and write amplification factors; and
the rate of free space production takes into account both free space returned via recycling for garbage collection and free space returned via recycling for wear leveling.

13. The method according to claim 11, further comprising: determining the ratio of activity between the recycling for garbage collection and the recycling for wear leveling based upon a program and erase (PE) range.

14. The method according to claim 13, further comprising:
comparing the program and erase (PE) range to a predefined target PE range associated with the memory.

15. The method according to claim 11, wherein the rate of free space consumption is determined according to one or more of directly measuring the rate of free space consumption by accounting for space being written in the non-volatile memory, calculating the rate of free space consumption from a measured amount of host writes, and indirectly calculating write amplification based on used space tracking statistics.

16. The method according to claim 11, wherein the rate of free space production is determined based upon a rate at which predefined units of the memory complete the recycling process.

17. The method according to claim 11, further comprising:
balancing free space consumption and free space production by speeding up or slowing down one or both of the recycling of the portion of the memory selected for garbage collection and the recycling of the portion of the memory selected for wear leveling.

18. An apparatus comprising:
a memory configured to store data; and
a controller configured to process a plurality of input/output requests to read/write to/from the memory, measure a rate of free space consumption in the memory, measure a rate of free space production in the memory, generate garbage collection requests selecting portions of the memory for garbage collection, generate wear leveling requests selecting portions of the memory for wear leveling, and adjust a rate of a recycling process in response to the measured rate of free space consumption and the measured rate of free space production, wherein the controller is further configured to perform recycling operations for garbage collection and recycling operations for wear leveling concurrently by interleaving the recycling operations being performed in response to the garbage collection requests and the recycling operations being performed in response to the wear leveling requests at page level fine grain boundaries, and control a ratio of activity between the recycling operations for garbage collection and the recycling operations for wear leveling.

19. The apparatus according to claim 18, wherein the controller and the memory are part of a solid state drive (SSD).

20. The apparatus according to claim 18, wherein the controller is further configured to smoothly change the ratio of activity between the recycling operations for garbage collection and the recycling operations for wear leveling to maintain a predetermined rate of wear leveling.

* * * * *